(12) United States Patent
Itatani et al.

(10) Patent No.: US 7,354,621 B2
(45) Date of Patent: Apr. 8, 2008

(54) METHOD FOR FORMING ADHESIVE LAYER

(75) Inventors: Osamu Itatani, Kyoto (JP); Masato Sagawa, Kyoto (JP)

(73) Assignee: Intermetallics Co., Ltd., Kyoto (JP)

( * ) Notice: Subject to any disclaimer, the term of this patent is extended or adjusted under 35 U.S.C. 154(b) by 0 days.

(21) Appl. No.: 10/559,435

(22) PCT Filed: Jun. 2, 2004

(86) PCT No.: PCT/JP2004/007626

§ 371 (c)(1),
(2), (4) Date: Dec. 5, 2005

(87) PCT Pub. No.: WO2004/108304

PCT Pub. Date: Dec. 16, 2004

(65) Prior Publication Data

US 2006/0134319 A1    Jun. 22, 2006

(30) Foreign Application Priority Data

Jun. 6, 2003    (JP)    ............................. 2003-161500

(51) Int. Cl.
 *B05D 5/10* (2006.01)
 *B05D 1/28* (2006.01)
(52) U.S. Cl. ........................ 427/242; 427/11; 427/346; 427/207.1
(58) Field of Classification Search .................. 427/11, 427/242, 346, 207.1
See application file for complete search history.

(56) References Cited

U.S. PATENT DOCUMENTS 4,621,024 A    11/1986    Wright
5,273,782 A    12/1993    Sagawa et al.
5,505,990 A *  4/1996    Sagawa et al. ............. 427/184
5,819,875 A    10/1998    Johnston
6,113,979 A    9/2000    Sagawa et al.

(Continued)

FOREIGN PATENT DOCUMENTS

EP    0 528 292 A1    2/1993

(Continued)

OTHER PUBLICATIONS

Handbook of Pressure Sensitive Adhesive Technology, D. Santas, pp. 699-700.*

*Primary Examiner*—Fred J. Parker
(74) *Attorney, Agent, or Firm*—Oliff & Berridge, PLC

(57) ABSTRACT

In a method for forming an adhesive layer on the surface of a workpiece before the formation of a coating film containing a powder on the workpiece, the present invention provides a method for forming the adhesive layer having a desired thickness. This object is achieved by the following method: An adhesive layer formation medium m1 coated with an adhesive material is made to collide with a workpiece W so that the adhesive material is transferred from the adhesive layer formation medium m1 to the workpiece W and forms an adhesive layer on the workpiece. An adhesive layer having a desired thickness can be formed on the workpiece by regulating the thickness of the adhesive material applied to the surface of the adhesive layer formation medium (i.e. the amount of the adhesive material held by a single adhesive layer formation medium). This enables the thickness of the powder coating as the final product to be controlled as desired.

10 Claims, 3 Drawing Sheets

U.S. PATENT DOCUMENTS

2001/0006733 A1* 7/2001 Sagawa et al. .............. 428/429
2002/0032280 A1* 3/2002 Charles et al. .............. 525/107

FOREIGN PATENT DOCUMENTS

| | | |
|---|---|---|
| EP | 0 582 999 A1 | 2/1994 |
| EP | 0 899 024 A1 | 3/1999 |
| EP | 1 166 895 A1 | 1/2002 |
| JP | A 62-501338 | 6/1987 |
| JP | A 5-302176 | 11/1993 |
| JP | A 7-112160 | 5/1995 |
| JP | A 7-136577 | 5/1995 |
| JP | A 7-195026 | 8/1995 |
| JP | 08-257484 | * 10/1996 |
| JP | A 8-257484 | 10/1996 |

* cited by examiner

METHOD FOR FORMING ADHESIVE LAYER

TECHNICAL FIELD

As disclosed in the Japanese Unexamined Patent Publication Nos. H05-302176, H07-112160, H07-136577 and other patent applications, the applicant of the present invention has proposed a powder-coating method in which a workpiece (i.e. an object or a part to be coated with powder) having an adhesive layer formed on its surface, fine particles of powder, a powder-coating medium and so on are vibrated with a vibrator so as to apply the powder to the surface of the workpiece via the powder-coating medium. This method can be used to paint the body or other elements of electronic devices, such as cellular phones or notebook computers. The present invention relates to a method for forming an adhesive layer on the surface of a workpiece, which is performed as a step of the above-described powder-coating method.

BACKGROUND ART

Currently, various kinds of liquid thermosetting resins are used as an adhesive material for forming an adhesive layer. Forming a uniform adhesive layer on the surface of a workpiece requires a resin having a high degree of fluidity. Therefore, the resin used for this purpose is usually dissolved into, diluted with or dispersed in an organic solvent, water or other solvent. Using the liquid resin prepared by diluting a resin with an organic solvent or a similar solvent as described above, an adhesive layer is formed on the surface of the workpiece by dipping the workpiece in a reservoir containing the resin, or by spraying the resin onto the workpiece. An example of the liquid resins currently used is a thermosetting epoxy resin, containing 97% resin and 3% curing agent, diluted with methyl ketone.

DISCLOSURE OF THE INVENTION

PROBLEMS TO BE SOLVED BY THE INVENTION

In the above-described powder-coating method, the powder is directly, or via the powder-coating medium, applied to the workpiece having the adhesive layer formed on its surface, and then the powder is pressed onto or into the adhesive layer by the beating action of the powder-coating medium. Along with this process, the adhesive material constituting the adhesive layer, which is now covered with the powder, is extruded up to the surface of the powder by the beating action of the powder-coating medium. The adhesive material thus extruded also receives the collision of the powder-coating medium, whereby the powder held on the powder-coating medium is transferred to the workpiece. Thus, the powder is continuously applied to the workpiece. Such a powder applying process, or a powder coating process, is finished when the adhesive material constituting the adhesive layer can no longer be extruded up to the surface of the powder by the beating action of the powder-coating medium onto the workpiece. Therefore, the thickness of the adhesive layer applied to the workpiece decisively influences the thickness of the powder coating formed on the workpiece.

As explained previously, the adhesive layer on the surface of the workpiece is formed by dipping the workpiece in a reservoir containing a liquid resin diluted with a solvent, or by spraying a liquid resin diluted with a solvent onto the surface of the workpiece. Use of such a dipping or spraying means, however, makes it difficult to regulate the thickness of the liquid resin applied to the workpiece, which means that it is difficult to form a powder coating having a desired thickness on the workpiece. Another problem that further increases the difficulty in the regulation of the thickness of the adhesive layer formed on the workpiece exists in that the solvent should be removed from the liquid resin applied to the workpiece. Moreover, if the liquid resin is applied using a dipping or spraying means, the liquid resin applied to the surface of the workpiece is locally collected and forms one or more pools on the surface of the workpiece, which causes the adhesive layer formed on the surface of the workpiece to be uneven in thickness.

After the liquid resin is applied to the surface of the workpiece, it is necessary to remove the solvent and other components. Therefore, conventionally, a heat treatment is performed on the workpiece coated with the liquid resin to evaporate the solvent and other components. This method takes a long time for the formation of the adhesive layer and is problematic with respect to the conservation of energy.

Furthermore, if the thermosetting resin has a low curing temperature, it is impossible to perform the heat treatment to evaporate the solvent and other components, and the resin needs to be left at room temperature. This requires a longer time for the adhesive layer to be formed.

Thus, an object of the present invention is to solve the above-described problems relating to the conventional method for forming an adhesive layer.

MEANS FOR SOLVING THE PROBLEMS

To solve the above-described problems, a method for forming an adhesive layer according to the present invention is characterized in that the adhesive layer is formed on a workpiece by making an adhesive layer formation medium coated with an adhesive material collide with the workpiece so that the adhesive material applied to the adhesive layer formation medium is transferred to the workpiece.

Another method for forming an adhesive layer according to the present invention is characterized in that the adhesive layer formation medium coated with an adhesive material and a workpiece are put into a container, and an adhesive layer is formed on the workpiece by vibrating the adhesive layer formation medium or the workpiece, or by stirring the adhesive layer formation medium and the workpiece.

In the above-described methods for forming an adhesive layer, it is preferable to form the adhesive layer on the surface of the workpiece having little or no adhesive material applied to it.

In the above-described methods for forming an adhesive layer, it is preferable to maintain the thickness of the adhesive layer formed on the adhesive layer formation medium within a specific range so that the adhesive layer to be formed on the workpiece has a uniform thickness.

The adhesive material may desirably contain a liquid material. A preferable example of the liquid material is a liquid resin, which may preferably contain a curing agent. The adhesive material may also contain spacer particles. Finally, the adhesive material desirably consists of a substantially non-volatile material.

A powder-coating method according to the present invention is characterized in that a powder coating is formed on the surface of a workpiece by applying fine particles of powder to an adhesive layer formed on the surface of the workpiece by one of the above-described methods for forming an adhesive layer. The adhesive material may preferably contain spacer particles, where the spacer particles preferably consist of particles of the powder.

EFFECT OF THE INVENTION

With the above-described constructions, the present invention yields the following effects.

According to the present invention, an adhesive layer is formed on the workpiece by making an adhesive layer formation medium coated with an adhesive material having a thickness within a specific range collide with the workpiece so that the adhesive material applied to the adhesive layer formation medium is transferred to the workpiece. This method enables an adhesive layer having a desired thickness to be formed on the workpiece by regulating the thickness of the adhesive layer applied to the surface of the adhesive layer formation medium, or by regulating the amount of the adhesive material held by a single adhesive layer formation medium. Therefore, in the subsequent powder coating process, a powder coating having a desired thickness can be formed on the surface of the workpiece.

Also, according to the present invention, an adhesive layer is formed on a workpiece by making an adhesive layer formation medium coated with an adhesive material collide with the workpiece so that the adhesive material is transferred to the workpiece. This method prevents the formation of a pool that is observed if the workpiece is dipped in a reservoir containing a liquid resin used as the adhesive material or the liquid resin is sprayed onto the workpiece as in the conventional methods for forming an adhesive layer. Thus, an adhesive layer having a uniform thickness on the workpiece is obtained.

The presence of the spacer particles on the surface of the adhesive layer formation medium prevents the medium from being trapped onto the workpiece. It also improves the smoothness of the surface of the adhesive layer to be formed on the workpiece.

Since there is no need to use any solvent or similar component to be removed after the application of the adhesive material, the present invention not only simplifies the process of forming an adhesive layer but also realizes the conservation of energy and the prevention of pollution. Furthermore, the elimination of the heat treatment for removing the solvent and other components increases the degree of freedom of the curing agent and the base resin available.

EXPLANATION OF NUMERALS

Figure 1:
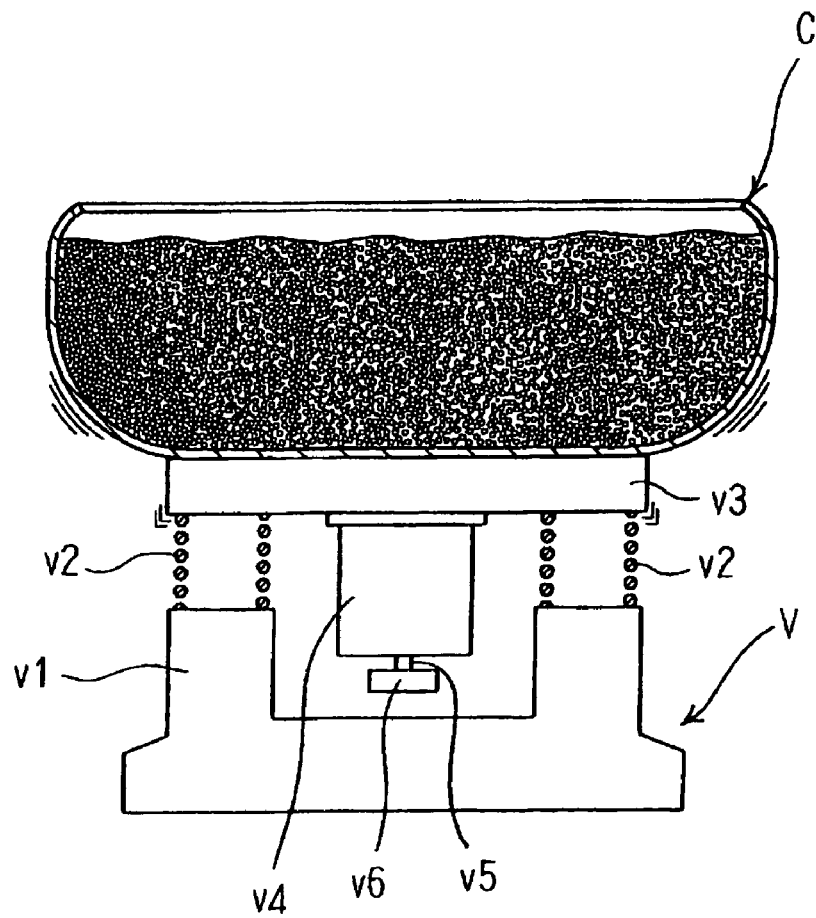
FIG. 1 is a front view including a partial section of a vibrator with a container attached to it as an example of the means for applying an adhesive material to an adhesive layer formation medium.

C—container
V—vibrator
W—workpiece
m1—adhesive layer formation medium
m2—adhesive material
m3—spacer particle

BEST MODE FOR CARRYING OUT THE INVENTION

Embodiments of the method for forming an adhesive layer according to the present invention are described. It should be noted that embodiments are not restricted to the following ones described and may take any form as long as it is within the scope of the present invention.

In the present invention, a layer of adhesive material is created on the surface of the adhesive layer formation medium by applying an adhesive material or an adhesive material containing a liquid material to the medium. This layer, called the adhesive layer hereinafter, consists of a material that hardly or never evaporates during the process of forming an adhesive layer on the workpiece.

Various kinds of liquid materials, including liquid resins, are available as the adhesive material constituting the adhesive layer. In addition to liquid resins, examples of the liquid materials include water glass, gelatin, glue and lacquer. For the liquid resin, there are various kinds of resins available, including epoxy resin, polyester resin, acrylic resin, polyurethane resin, fluororesin and melamine resin. For a liquid material having a high viscosity, it is allowable to add a compound of a certain kind of resin as a viscosity reducer.

A curing agent may be added to the liquid resin used as the adhesive material. It is also possible to add spacer particles to the liquid material used as the adhesive material constituting the adhesive layer.

Examples of the curing agent include dicyandiamide, imidazole, isocyanate, acids and their anhydride.

The spacer particle is a fine particle made of silica, alumina, zirconia, aluminum hydroxide, various kinds of metal and resins, and so on. The size and load of the particles should be appropriately determined according to the form and size of the adhesive layer formation medium. In a preferable case, the diameter is about 1 to 20 μm and the volume percentage in the adhesive material is about 5 to 30%. For the spacer particles, it is desirable to use fine particles of powder that will constitute the powder coating to be obtained as the final product.

Examples of the material for the adhesive layer formation medium include iron, carbon steel, other alloy steels, copper and its alloy, aluminum and its alloy, and other kinds of metal and alloy, $Al_2O_3$, $SiO_2$, $TiO_2$, $ZrO_2$, SiC and other kinds of ceramic, glass, hard glass and so on. The size, material and other properties of the adhesive layer formation medium can be appropriately determined according to the shape and size of the workpiece, the material and other properties of the powder constituting the film to be formed on the workpiece, and other factors. Plural types of adhesive layer formation media differing in size and material may be mixed together. It is possible to perform a surface treatment or surface coating on the adhesive layer formation medium. The adhesive layer formation medium can take various shapes: sphere, ellipse, cube, triangle pole, cylinder, circular cone, triangular pyramid, rectangular pyramid, rhombohedron and other indefinable shapes. Each of the adhesive layer formation media having the above-listed shapes may be used independently, or two or more types may be mixed together. As for the size of the adhesive layer formation medium, a preferable range is 0.3 to a few millimeters in diameter if the medium is spherical.

An example of the device available for applying a mixture for forming an adhesive layer to the adhesive layer formation medium is shown in FIG. 1, in which a container C is attached to a vibrator V. In FIG. 1, the vibrator V has a base v1 supporting a vibrating plate v3 via coil springs v2, and the container C is mounted on the vibrating plate v3. A motor v4 is located under the vibrating plate v3, and a weight v6 is eccentrically connected to the output shaft v5 of the motor v4. In this construction, when the motor v4 is energized, the weight v6 rotates in an eccentric manner, thereby vibrating the container C mounted on the vibrating plate v3.

A mixture of the adhesive layer formation medium and the liquid material used as the adhesive material, a mixture of the adhesive layer formation medium and the liquid resin used as the adhesive material with a curing agent added to it, or a mixture of the adhesive layer formation medium and the liquid material as the adhesive material with spacer particles added to it, is put into the contained C attached to the vibrator V, as shown in FIG. 1, and mixed together. As a result, the surface of the adhesive layer formation medium is evenly covered with the liquid material, the liquid resin with the curing agent added to it, or the liquid material with the spacer particles added to it. Thus, an adhesive layer formation medium having an adhesive layer on its surface is obtained. Instead of using a vibrator V having a container C as shown in FIG. 1, it is possible to put the mixture into a normal container and stir it with a stirrer to form an adhesive layer on the surface of the adhesive layer formation medium.

Figure 2:
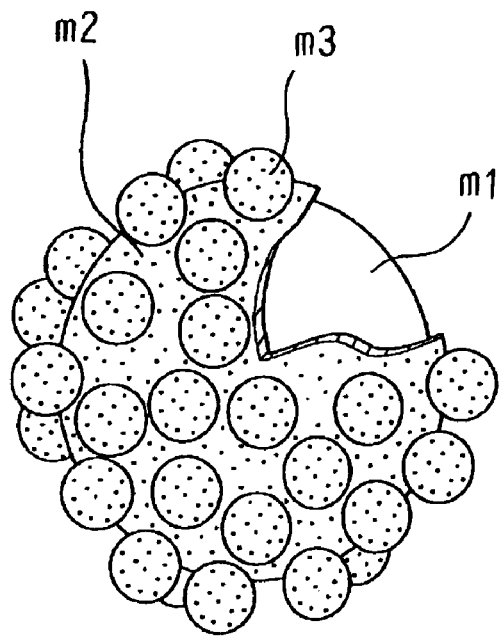
FIG. 2 is a schematic perspective view of an adhesive layer formation medium having an adhesive layer formation medium applied and spacer particles attached to it.

FIG. 2 schematically shows an adhesive layer formation medium having an adhesive layer formed by one of the above-described processes in which a mixture of the adhesive layer formation medium, the spacer particles and the adhesive material is put into the container C attached to the vibrator V. The adhesive layer formation medium m1 thus produced is coated with the adhesive material m2, and a predetermined amount of the spacer particles m3 coated with the adhesive material are adhered to the medium.

The thickness of the adhesive layer formed on the surface of the adhesive layer formation medium can be arbitrarily determined by appropriately regulating the amount of the liquid material put into the container C as the adhesive material with respect to the total surface area of the adhesive layer formation medium loaded into the container C.

Figure 3:
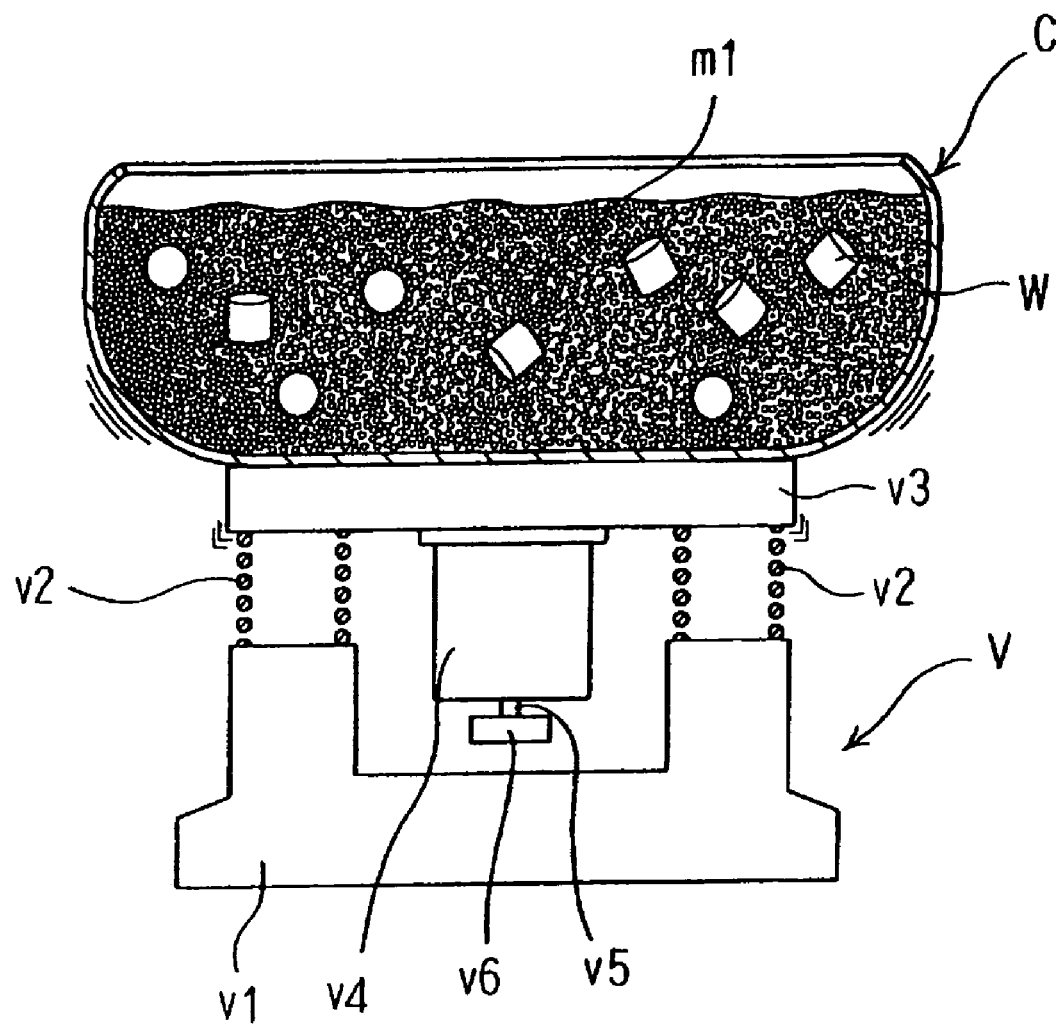
FIG. 3 is a front view including a partial section of an adhesive layer formation device for forming an adhesive layer on a workpiece.

As shown in FIG. 3, the adhesive layer formation medium having the adhesive layer formed as described above is put in the container C attached to the vibrator V shown in FIG. 1, and workpieces W having little or no adhesive material applied to it is thrown into it. Then, the vibrator V is energized to vibrate the container C holding the adhesive layer formation medium m1 coated with the adhesive layer and the workpieces W having little or no adhesive material applied to it. This operation makes the adhesive layer formation medium m1 coated with the adhesive layer collide with or come into friction with the workpieces W. In some cases, the term "friction" might be more suitable to describe the action of the adhesive layer formation medium against the workpieces W. However, in the present description, the term "collision" is also used to refer to an action that should be usually regarded as "friction." As a result of the collision, the adhesive layer formed on the adhesive layer formation medium m1 is transferred to the workpieces W. In other words, the workpieces W scrape the adhesive layer from the adhesive layer formation medium m1, and the adhesive layer thus scraped forms an adhesive layer on the surface of the workpieces W. Thus, an adhesive layer having a predetermined thickness is formed on the workpieces W by repetitive processes of transferring the adhesive layer from the adhesive layer formation medium m1 to the workpieces W and then separating the adhesive layer formation medium m1 from the workpieces W.

The same adhesive layer can be also formed on the surface of the workpieces W by stirring the adhesive layer formation medium m1 coated with the adhesive layer and the workpieces W, using a stirrer.

In each of the processes described above, it is possible to control the thickness of the adhesive layer formed on the workpiece by regulating the thickness of the adhesive material applied to the surface of the adhesive layer formation medium, or the amount of the adhesive material held by each particle of the adhesive layer formation medium, and also regulating the viscosity of the adhesive material forming the adhesive layer and the amount of the spacer particles.

The amount of the adhesive layer formation medium needs to be sufficiently large, irrespective of the thickness or size of the adhesive layer to be obtained. To uniformly apply the adhesive material to the entire surface of the workpiece on which the adhesive layer should be formed, it is necessary to allow the adhesive layer formation medium coated with the adhesive material to evenly beat or rub the surface of the workpiece a large number of times.

Thus, the present invention enables an adhesive layer having a desired thickness to be formed on the workpiece. Therefore, it is possible to regulate the thickness of the powder coating formed on the surface of the workpiece, using a powder-coating device to be described later.

The adhesive material constituting the adhesive layer formed on the adhesive layer formation medium does not contain any substance to be removed by an evaporation process. Accordingly, the adhesive layer formed on the workpiece does not contain such a material, either. Therefore, there is no need to heat the workpiece to evaporate any solvent or other component. As a result, the total time required for the formation of the adhesive layer becomes shorter than that required in the case of forming an adhesive layer on the workpiece by a conventional method. It also contributes the conservation of energy and the prevention of pollution. There is no possibility that the thickness of the adhesive layer formed on the workpiece will change due to evaporation. Therefore, the thickness of the adhesive layer can be easily controlled.

As opposed to the conventional method for forming an adhesive layer on a workpiece, there is no need to perform a heat treatment. This facilitates the use of a thermosetting resin having a low curing temperature as the adhesive material.

As shown in FIG. 2, it is preferable to use an adhesive layer formation medium m1 coated with an adhesive material m2 and having spacer particles m3 coated with the adhesive material. In the following description, the adhesive layer formation medium m1, the adhesive material m2 and the spacer particles m3 are integrally referred to as the "adhesive/spacer medium m0." Similar to the case described earlier, the adhesive/spacer medium m0 is put in the container C attached to the vibrator V shown in FIG. 3, and workpieces W having little or no adhesive material applied to it is thrown into it. The container C holding the adhesive/spacer medium m0 and the workpieces W is then vibrated with the vibrator V so as to vibrate the adhesive/spacer medium m0 and the workpieces W and make the adhesive/spacer medium m0 collide with the workpieces W. As a result of the collision, the adhesive material m2 and the spacer particles m3 sticking to the adhesive layer formation medium m1 are transferred to the workpieces W. In other words, the workpieces W scrape the adhesive material m2 and the spacer particles m3 from the adhesive layer formation medium m1, and the adhesive material m2 and the spacer particles m3 thus scraped form an adhesive layer. Subsequently, the adhesive layer formation medium m1 is separated from the workpieces W. Such a process is repeated to form an adhesive layer consisting of the adhesive material m2 and the spacer particles m3 and having a predetermined thickness.

In the collision of the adhesive/spacer medium m0 against the workpieces W, the presence of the granular spacer particles m3 on the adhesive layer formation medium m1 makes the adhesive layer formation medium m1 come in contact with the workpieces W at a smaller area than in the case where there is no spacer particle m3 present on the surface of the adhesive layer formation medium m1. This reduces the adhesion power between the workpieces W and the adhesive layer formation medium m1, so that the adhesive layer formation medium m1 is hardly trapped on the surface of the workpieces W. The use of the spacer particles m3 effectively prevents the formation of a defect in the powder coating to be obtained. If an adhesive layer formation medium m1 is trapped on the surface of the workpieces W, a defect would be formed in the resultant powder coating and, accordingly, in the continuous coating film to be formed on the surface of the workpiece after the powder coating is cured with heat. The resultant powder coating created from the adhesive layer will contain the spacer particles m3. Therefore, the spacer particles m3 can be effectively utilized as a component of the powder coating if particles of the powder constituting the powder coating are used as the spacer particles m3.

When an adhesive layer formation medium m1 with the spacer particles m3 adhered to it collides with the adhesive layer formed on the workpieces W and rolls over the surface of the workpieces W, it creates a recess and scratches in the adhesive layer. The depth of the recess or scratches thus created is smaller than that observed in the case where there is no spacer particle m3 adhered to the adhesive layer formation medium m1. Thus, the smoothness of the surface of the adhesive layer formed on the workpiece W is enhanced.

A powder-coating method in which a powder coating is formed by applying powder to the surface of the workpieces W coated with an adhesive layer is roughly described. The device shown in FIG. 1, i.e. the vibrator V with the container C attached to it, is used hereby as the powder-coating device.

In this method, workpieces W with an adhesive layer, fine particles of powder for forming a powder coating, a powder-coating medium similar to the adhesive layer formation medium, and other materials are put into the container C. Then, the vibrator V is energized to vibrate the container C, thereby forming a powder coating on the surface of the workpieces W. Such a powder-coating device is disclosed in the aforementioned Japanese Patent Publication Nos. H05-302176, H07-112160 and H07-136577, all of which are the patent applications of the present applicant.

In the above-described powder-coating method, the powder is directly, or via the powder-coating medium, applied to the workpiece having an adhesive layer formed on its surface, and then the powder is pressed onto or into the adhesive layer by the beating action of the powder-coating medium. Along with this process, the adhesive material forming the adhesive layer, which is now covered with the powder, is extruded up to the surface of the powder by the beating action of the powder-coating medium. The adhesive material thus extruded also undergoes the beating action of the powder-coating medium, whereby the powder is transferred from the powder-coating medium to the workpiece. Thus, the powder continuously applied to the workpiece. Such a powder applying process, or a powder coating process, is finished when the adhesive material constituting the adhesive layer can no longer be extruded up to the surface of the powder by the beating action of the powder-coating medium onto the workpiece.

The powder-coating medium strikes the powder applied to the adhesive layer on the surface of the workpiece, thereby pressing the powder onto or into the adhesive layer to firmly fix the powder to the adhesive layer. Also, by striking the powder attached to the adhesive layer, the powder-coating medium extrudes the adhesive material from the adhesive layer below the powder up to the surface of the powder and applies more powder to the adhesive material constituting the extruded adhesive layer, thereby creating a high-density multi-layer structure of the powder on the surface of the workpiece. Furthermore, by colliding with the workpiece, the powder-coating medium performs a kind of transferring action in which the powder present on the powder-coating medium is transferred to the workpiece, thereby accelerating the deposition of the powder on the workpiece.

In many applications of the present invention, a heat treatment is performed after the powder coating is formed on the workpiece. Heating the powder coating created on the surface of the workpiece melts some components of the powder coating whose melting point is lower than the heating temperature, thereby smoothing the surface of the coating film. The molten components fill the spaces between other components of the powder whose melting points are higher than the heating temperature, thus forming a fine coating film. In this process, the curing agent cures the liquid resin, which is contained in the adhesive layer formed on the workpiece before the formation of the powder coating, and the low melting point components of the powder coating, which has been melted by the heat. Thus, the heating process turns the powder coating formed on the workpiece into a smooth, strong coating film. The curing agent used hereby is added to both the adhesive material for forming the adhesive layer and the powder for forming the powder layer, or only to the powder.

A more specific example is described below.

An epoxy resin was used as the liquid resin. To reduce the viscosity of the epoxy resin, a reactive epoxy diluent was added to the epoxy resin by a ratio of 30:100. Dicyandiamide was used as the curing agent. Spherical particles made of acrylic resin and having a diameter of 5 μm were used as the spacer particles. Zirconia balls having a diameter of 1 mm were used as the adhesive layer formation medium. Ten kilograms of adhesive layer formation medium, 4 g of spacer particles, 20 g of epoxy resin with reactive diluent added to it, and 2 g of curing agent were put in the container C (capacity: 3l) mounted on the vibrator V, and the container C was vibrated for ten minutes to form an adhesive layer made of the epoxy resin with the reactive diluent on the adhesive layer formation medium and adhere the spacer particles to the same medium. Then, the adhesive layer formation medium with the adhesive layer and the spacer particles adhered to it was again put in the container C mounted on the vibrator V, and twenty pieces of MQ bonded magnets having an outer diameter of 20 mm, an inner diameter of 18 mm and a height of 7 mm were also put in the container C, which was then vibrated for one minute. As a result, a uniform adhesive layer having a thickness of 2 to 3 μm was formed. Subsequently, the MQ bonded magnets with the adhesive layer formed on it were put into a container for forming the powder coating and thereby vibrated. The type and size of the vibrator and the container hereby used are the same as used previously for forming the adhesive layer. Three kilograms of rubber-lined spherical alumina particles having a diameter of 0.5 mm as the powder-coating medium, and 30 g of a powder mixture composed of epoxy powder having an average diameter of 5 µm and mica powder having an average diameter of 5 µm by a ratio of 100:20, were put into the container, which was then vibrated for 5 minutes. Subsequently, twenty pieces of the MQ bonded magnets with the adhesive layer formed as described above were thrown into the container, which was then vibrated for 2 minutes. Thus a powder layer was formed on each of the MQ bonded magnets, which were then taken out from the container and put into a furnace to be heated for 20 minutes at 180 degrees Celsius. The thickness of coating layer formed on the MQ bonded magnets were within the range from 15 to 25 µm.

In the above-described example of forming an adhesive layer and a powder layer, it was necessary to maintain the amounts of the adhesive material, the curing agent and the spacer particles to be added to the adhesive layer formation medium within a specific range so that a coating film having a thickness of 15 to 25 µm can be formed on the surface of the workpiece in a stable manner. In the above-described example, the initial amounts of these components were as follows: 20 g of epoxy resin with reactive diluent, 2 g of curing agent and 4 g of spacer particles. These components are consumed with the progress of the formation of the adhesive layer. Therefore, if the consumption of any component has exceeded a predetermined amount, it is necessary to additionally supply that component. Our experiment showed that the total amount of the components added to the adhesive layer formation medium should be controlled to be within the range of 26±5 g with their percentages maintained at the specified values to obtain a coating film having a thickness of 15 to 25 µm in a stable manner.

The method for forming an adhesive layer according to the present invention is characterized in that the liquid resin (i.e. liquid thermosetting resin) mixed with the curing agent contains no solvent. This eliminates the necessity of performing a heat treatment on the workpiece coated with the liquid thermosetting resin to remove the solvent and other components as in the conventional methods for forming an adhesive layer. Thus, the present invention not only shortens the time required for the formation of the adhesive layer but also contributes to the conservation of energy.

The elimination of the heat treatment for removing the solvent and other components allows the use of a liquid thermosetting resin that cures at room temperature. This increases the degree of freedom of the curing agent and the base resin available, thereby widening the scope of choice for the workpiece.

Furthermore, the present invention eliminates the unevenness in the thickness of the adhesive layer due to the evaporation of components such as the solvent used as the diluent for a resin used as the adhesive material. Therefore, it is possible to constantly form an adhesive layer having a specified thickness on the surface of the workpiece, thereby improving the evenness in the thickness of the adhesive layer among plural workpieces and facilitating the regulation of the thickness of the adhesive layer.

The presence of the spacer particles on the adhesive layer formation medium prevents the medium from being trapped onto the workpiece.

This method prevents the formation of a pool that is observed if the workpiece is dipped in a reservoir containing a liquid resin used as the adhesive material or the liquid resin is sprayed onto the workpiece. Thus, an adhesive layer having a uniform thickness is formed on the workpiece.

In the method described thus far, an adhesive layer having a predetermined thickness is formed on a workpiece by repetitive processes of making an adhesive layer formation medium collide with the workpiece to transfer an adhesive material and spacer particles from the adhesive layer formation medium to the workpiece and then separating the adhesive layer formation medium from the workpiece. The amounts of the adhesive material and the spacer particles that have been transferred from the adhesive layer formation medium to the workpiece can be calculated beforehand from the area of the target section of the workpiece on which the adhesive layer is to be formed and the average thickness of the adhesive layer to be formed on that section. Accordingly, after the workpieces W that have been coated with the adhesive layer by the adhesive layer formation device shown in FIG. 3 is taken out from the container C, the amounts of the adhesive material and the spacer particles consumed by the workpiece during the process are calculated, and the material and the particles are added to the container C by the amounts calculated, using a dispenser or similar apparatus, to supplement the adhesive layer formation medium with the adhesive material and the spacer particles by as much amounts as transferred to the workpiece. Now, with the adhesive layer formation medium having the same amounts of the adhesive material and the spacer particles as in the initial condition, it is possible to put a new workpiece into the container C and repeat the process of forming the adhesive layer having a predetermined thickness on the surface of the workpiece.

Figure 4:
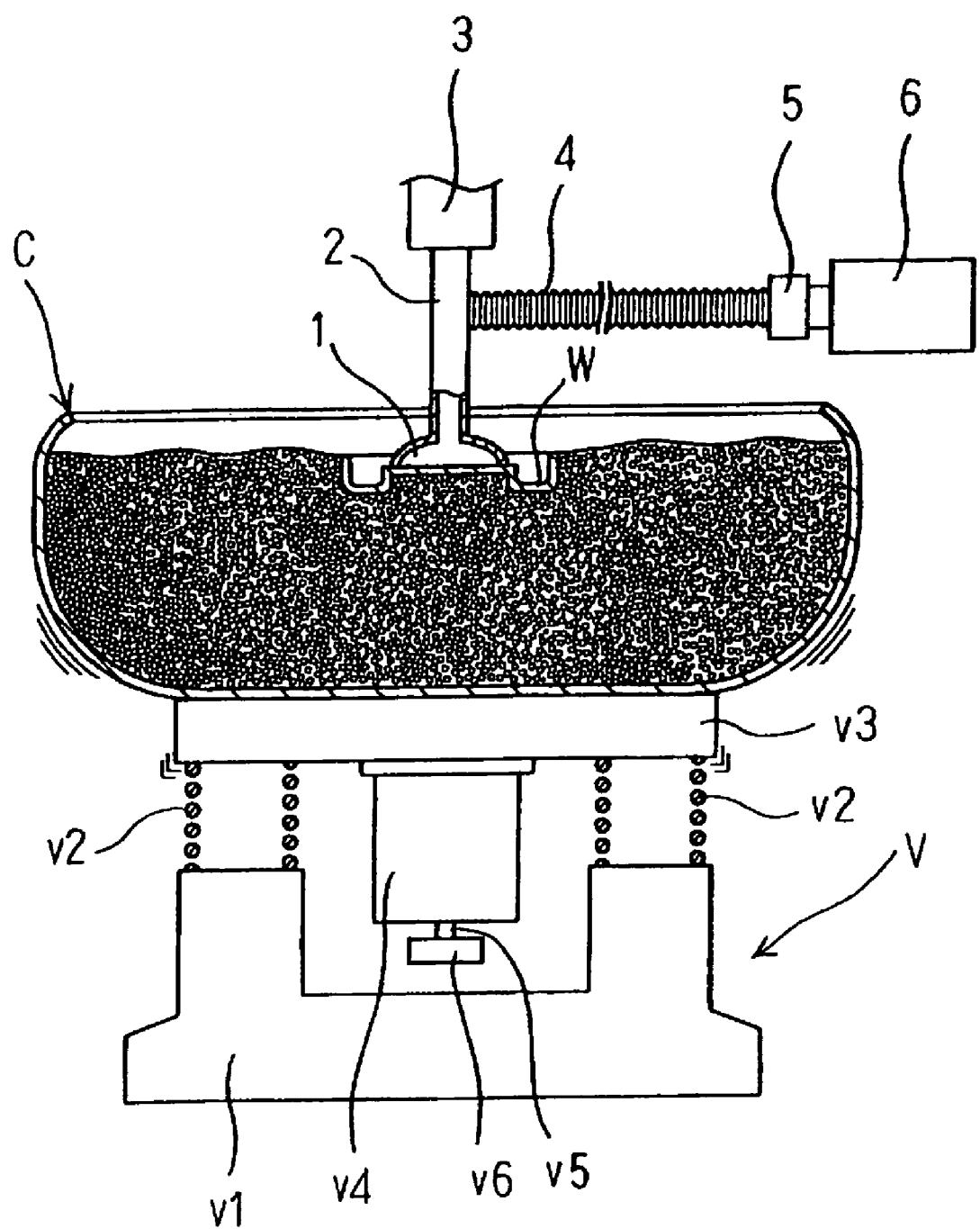
FIG. 4 is a front view including a partial section of another embodiment of an adhesive layer formation device for forming an adhesive layer on a workpiece.

Another example of the device for forming an adhesive layer is described with reference to FIG. 4.

A workpiece W held by a suction pad 1 is set in the container C holding an adhesive layer formation medium coated with an adhesive material so that the workpiece W comes in contact with the adhesive layer formation medium coated with the adhesive material. A pipe 2 leading to the suction pad 1 is fixed to a support member 3, and a flexible pipe 4 is connected to the pipe 2. The flexible pipe 4 is connected to an air pump system 6 via a valve 5. When the valve 5 is opened, the workpiece W is securely pulled by the suction pad 1. Then, as described above, the motor v4 is energized to vibrate the container C mounted on the vibrating plate v3 so as to form an adhesive layer on the workpiece W as in the case of FIG. 3. It is also possible to horizontally vibrate or oscillate the support member 3 to accelerate the formation of the adhesive layer on the workpiece W or improve the uniformity in the thickness of the adhesive layer. The present method is applicable to the painting of products having a relatively large area, such as the body of a cellular phone or a notebook computer.

The invention claimed is:

1. A method for forming an adhesive layer comprising:
putting adhesive layer formation media coated with adhesive materials and at least one workpiece into a container;
vibrating or stirring in the container the adhesive layer formation media and the at least one workpiece so that the adhesive layer formation media and the at least one workpiece collide with each other, thereby forming an adhesive layer on the surface of the workpiece.

2. The method for forming an adhesive layer according to claim 1, further comprising forming the adhesive layer on a surface of the at least one workpiece having little or no adhesive material applied to it.

3. The method for forming an adhesive layer according to claim 1, further comprising forming an adhesive layer on the adhesive layer formation media, the thickness of the adhesive layer being maintained within a specific range so that the adhesive layer to be formed on the at least one workpiece has a uniform thickness.

4. The method for forming an adhesive layer according to claim 1, wherein the adhesive material contains a liquid material.

5. The method for forming an adhesive layer according to claim 4, wherein the adhesive material contains a liquid resin.

6. The method for forming an adhesive layer according to claim 5, wherein the liquid resin contains a curing agent.

7. The method for forming an adhesive layer according to claim 1, wherein the adhesive material contains spacer particles.

8. The method for forming an adhesive layer according to claim 1, wherein the adhesive material consists of a substantially non-volatile material.

9. The method of claim 1 further comprising:
putting the at least one workpiece with the adhesive layer, particles of powder, and powder-coating media into a container; and
vibrating the at least one workpiece with the adhesive layer, particles of powder, and powder-coating media in the container.

10. The powder-coating method according to claim 9, wherein the adhesive material contains spacer particles, which consist of particles of the powder.

* * * * *